United States Patent
Warzelhan et al.

Patent Number: 5,936,045
Date of Patent: Aug. 10, 1999

[54] BIODEGRADABLE POLYMERS, THE PREPARATION THEREOF, AND THE USE THEREOF FOR PRODUCING BIODEGRADABLE MOLDINGS

[75] Inventors: Volker Warzelhan, Weisenheim; Gunter Pipper, Bad Dürkheim; Ursula Seeliger; Peter Bauer, both of Ludwigshafen; Dieter Bernhard Beimborn, Weisenheim; Motonori Yamamoto, Mannheim, all of Germany

[73] Assignee: BASF Aktiengesellschaft, Ludwigshafen, Germany

[21] Appl. No.: 08/894,240

[22] PCT Filed: Feb. 3, 1996

[86] PCT No.: PCT/EP96/00458

§ 371 Date: Aug. 14, 1997

§ 102(e) Date: Aug. 14, 1997

[87] PCT Pub. No.: WO96/25448

PCT Pub. Date: Aug. 22, 1996

[30] Foreign Application Priority Data

Feb. 16, 1995 [DE] Germany .................. 195 05 186

[51] Int. Cl.⁶ .................. C08G 63/672; C08G 63/91
[52] U.S. Cl. .................. 525/437; 525/411; 525/444; 525/448; 528/293; 528/294; 528/296; 528/301; 528/302
[58] Field of Search .................. 528/301, 293, 528/294, 296, 302; 525/448, 444, 411, 437

[56] References Cited

U.S. PATENT DOCUMENTS 3,763,079 10/1973 Fryd .
5,171,308 12/1992 Gallagher .................. 604/372
5,292,783 3/1994 Buchanan .................. 524/37

FOREIGN PATENT DOCUMENTS 0569143 11/1993 European Pat. Off. .
9102015 2/1991 WIPO .

*Primary Examiner*—Patricia A. Short
*Attorney, Agent, or Firm*—Keil & Weinkauf

[57] ABSTRACT

Biodegradable polymers comprising a polyether ester P1 obtained by reacting
a first mixture of 20–95 mol% of adipic acid or ester-forming derivatives thereof or mixtures thereof, 5–80 mol% of terephthalic acid or ester-forming derivatives thereof or mixtures thereof, and 0–5 mol% of a compound containing sulfonate groups, and a second mixture of 15–99.8 mol% of a dihydroxy compound selected from the group consisting of $C_2$–$C_6$-alkanediols and $C_5$–$C_{10}$-cycloalkanediols, 85–0.2 mol% of a dihydroxy compound I $$HO-[(CH_2)_n-O]_m-H$$

(n=2, 3 or 4, m=2–250)

with

0–5 mol%, based on the first mixture, of a compound D having at least three groups capable of ester formation, and a bisoxazoline C1, their preparation and their use in the manufacture of biodegradable molding materials.

19 Claims, No Drawings

BIODEGRADABLE POLYMERS, THE PREPARATION THEREOF, AND THE USE THEREOF FOR PRODUCING BIODEGRADABLE MOLDINGS

The present invention relates to biodegradable polyether esters obtained by reacting a bisoxazoline C1 with a polyether ester such as P1 obtainable by reacting a mixture essentially comprising (a1) a mixture essentially comprising
  25–95 mol% of adipic acid or ester-forming derivatives thereof or mixtures thereof,
  5–80 mol% of terephthalic acid or ester-forming derivatives thereof or mixtures thereof, and
  0–5mol% of a compound containing sulfonate groups, where the total of the individual mole percentages is 100 mol%, and (a2) a mixture of dihydroxy compounds essentially comprising
  (a21) from 15 to 99.8 mol% of a dihydroxy compound selected from the group consisting of $C_2$–$C_6$-alkanediols and $C_5$–$C_{10}$-cycloalkanediols,
  (a22) from 85 to 0.2 mol% of a dihydroxy compound containing ether functionalities of the formula I $$HO\text{---}[(CH_2)_n\text{---}O]_mH \qquad \text{I}$$

where n is 2, 3 or 4 and m is an integer from 2 to 250, or mixtures thereof,
where the molar ratio of (a1) to (a2) is chosen in the range from 0.4:1 to 1.5:1, with the proviso that the polyether ester P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyether ester P1 at 25° C.) and a melting point in the range from 50 to 200° C., and with the further proviso that from 0 to 5 mol%, based on the molar quantity of component (a1) employed, of a compound D with at least three groups capable of ester formation are employed to prepare the polyether ester P1, and the further proviso that the polyether ester P1 has both hydroxyl and carboxyl end groups, with the molar ratio of carboxyl end groups to hydroxyl end groups being chosen to be greater than one.

The invention furthermore relates to polymers and biodegradable thermoplastic molding compositions as claimed in the dependent claims, processes for the preparation thereof, the use thereof for producing biodegradable moldings and adhesives, biodegradable moldings, foams and blends with starch obtainable from the polymers and molding compositions according to the invention.

Polymers which are biodegradable, ie. decompose under environmental influences in an appropriate and demonstrable time span have been known for some time. This degradation usually takes place by hydrolysis and/or oxidation, but predominantly by the action of microorganisms such as bacteria, yeasts, fungi and algae. Y. Tokiwa and T. Suzuki (Nature, 270, (1977) 76–78) describe the enzymatic degradation of aliphatic polyesters, for example including polyesters based on succinic acid and aliphatic diols.

EP-A 565,235 describes aliphatic copolyesters containing [—NH—C(O)O—] groups (urethane units). The copolyesters of EP-A 565,235 are obtained by reacting a prepolyester, which is obtained by reacting essentially succinic acid and an aliphatic diol, with a diisocyanate, preferably hexamethylene diisocyanate. The reaction with the diisocyanate is necessary according to EP-A 565,235 because the polycondensation alone results only in polymers with molecular weights such that they display unsatisfactory mechanical properties. A crucial disadvantage is the use of succinic acid or ester derivatives thereof to prepare the copolyesters because succinic acid and derivatives thereof are costly and are not available in adequate quantity on the market. In addition, the polyesters prepared using succinic acid as the only acid component are degraded only extremely slowly.

WO 92/13020 discloses copolyether esters based on predominantly aromatic dicarboxylic acids, short-chain ether diol segments such as diethylene glycol, long-chain polyalkylene glycols such as polyethylene glycol (PEG) and aliphatic diols, where at least 85 mol% of the polyester diol residue comprise a terephthalic acid residue. The hydrophilicity of the copolyester can be increased and the crystallinity can be reduced by modifications such as incorporation of up to 2.5 mol% of metal salts of 5-sulfoisophthalic acid. This is said in WO 92/13020 to make the copolyesters biodegradable. However, a disadvantage of these copolyesters is that biodegradation by microorganisms was not demonstrated, on the contrary only the behavior towards hydrolysis in boiling water was carried out.

According to the statements of Y. Tokiwa and T. Suzuki (Nature, 270 (1977) 76–78 or J. of Appl. Polymer Science, 26 (1981) 441–448), it may be assumed that polyesters which are essentially composed of aromatic dicarboxylic acid units and aliphatic diols, such as PET (polyethylene terephthalate) and PBT (polybutylene terephthalate), are not enzymatically degradable. This also applies to copolyesters and copolyether esters which contain blocks composed of aromatic dicarboxylic acid units and aliphatic diols or ether diols.

Witt et al. (handout for a poster at the International Workshop of the Royal Institute of Technology, Stockholm, Sweden, Apr. 21–23, 1994) describe biodegradable copolyesters based on 1,3-propanediol, terephthalic ester and adipic or sebacic acid. A disadvantage of these copolyesters is that moldings produced therefrom, especially sheets, have inadequate mechanical properties.

It is an object of the present invention to provide polymers which are degradable biologically, ie. by microorganisms, and which do not have these disadvantages. The intention was, in particular, that the polymers according to the invention be preparable from known and low-cost monomer units and be insoluble in water. It was furthermore the intention that it be possible to obtain products tailored for the desired uses according to the invention by specific modifications such as chain extension, incorporation of hydrophilic groups and groups having a branching action. The aim was moreover that the biodegradation by micro-organisms should not be achieved at the expense of the mechanical properties in order not to restrict the number of applications.

We have found that this object is achieved by the polymers and thermoplastic molding compositions defined at the outset.

We have furthermore found processes for the preparation thereof, the use thereof for producing biodegradable moldings and adhesives, and biodegradable moldings and adhesives obtainable from the polymers and molding compositions according to the invention.

The polyether esters P1 according to the invention have a molecular weight ($M_n$) in the range from 5000 to 80,000, preferably from 6000 to 45,000, particularly preferably from 8000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polyether ester P1 at 25° C.) and a melting point in the range from 50 to 200, preferably from 60 to 160, ° C., and the further proviso that the polyether ester P1 has both hydroxyl and carboxyl end groups, with the molar ratio of carboxyl end groups to hydroxyl end groups being chosen to be greater than one, preferably greater than two.

The polyether esters P1 are obtained according to the invention by reacting a mixture essentially comprising (a1) a mixture essentially comprising
- 20–95, preferably from 30 to 80, particularly preferably from 40 to 70, mol% of adipic acid or ester-forming derivatives thereof, in particular the di-$C_1$–$C_6$-alkyl esters such as dimethyl, diethyl, dipropyl, dibutyl, diisobutyl, dipentyl and dihexyl adipate, or mixtures thereof, preferably adipic acid and dimethyl adipate, or mixtures thereof,
- 5–80, preferably 20–70, particularly preferably from 30 to 60, mol% of terephthalic acid or ester-forming derivatives thereof, in particular the di-$C_1$–$C_6$-alkyl esters such as dimethyl, diethyl, dipropyl, dibutyl, dipentyl or dihexyl terephthalate, or mixtures thereof, preferably terephthalic acid and dimethyl terephthalate, or mixtures thereof, and
- 0–5, preferably from 0 to 3, particularly preferably from 0.1 to 2, mol% of a compound containing sulfonate groups,
- where the total of the individual mole percentages is 100 mol%, and (a2) a mixture of dihydroxy compounds essentially comprising
- (a21) from 15 to 99.8, preferably from 60 to 99.5, particularly preferably from 70 to 99.5, mol% of a dihydroxy compound selected from the group consisting of $C_2$–$C_6$-alkanediols and $C_5$–$C_{10}$-cycloalkanediols,
- (a22) from 85 to 0.2, preferably from 0.5 to 40, particularly preferably from 0.5 to 30, mol% of a dihydroxy compound containing ether functionalities of the formula I

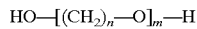

$$HO-[(CH_2)_n-O]_m-H \qquad I$$

where n is 2, 3 or 4, preferably two and three, particularly preferably two, and m is an integer from 2 to 250, preferably from 5 two to 100, or mixtures thereof,
where the molar ratio of (a1) to (a2) is chosen in the range from 0.4:1 to 1.5:1, preferably from 0.6:1 to 1.25:1.

The compound containing sulfonate groups which is normally employed is an alkali metal or alkaline earth metal salt of a dicarboxylic acid containing sulfonate groups, or the ester-forming derivatives thereof, preferably alkali metal salts of 5-sulfoisophthalic acid or mixtures thereof, particularly preferably the sodium salt.

The dihydroxy compounds (a21) employed according to the invention are selected from the group consisting of $C_2$–$C_6$-alkanediols and $C_5$–$C_{10}$-cycloalkanediols, such as ethylene glycol, 1,2- and 1,3-propanediol, 1,2- and 1,4-butanediol, 1,5-pentanediol or 1,6-hexanediol, in particular ethylene glycol, 1,3-propanediol and 1,4-butanediol, cyclopentanediol, cyclohexanediol, 1,2-cyclohexanedimethanol, 1,4-cyclohexanedimethanol, particularly preferably ethylene glycol and 1,4-butanediol, and mixtures thereof.

The dihydroxy compounds (a22) which are preferably employed are diethylene glycol, triethylene glycol, polyethylene glycol, polypropylene glycol and polytetrahydrofuran (poly-THF), particularly preferably diethylene glycol, triethylene glycol and polyethylene glycol, it also being possible to use mixtures thereof or compounds which have different n's (see formula I), for example polyethylene glycol which contains propylene units (n=3) for example obtainable by polymerization by conventional methods of initially ethylene oxide and subsequently with propylene oxide, particularly preferably a polymer based on polyethylene glycol with different n's, where units formed from ethylene oxide predominate. The molecular weight ($M_n$) of the polyethylene glycol is usually chosen in the range from 250 to 8000, preferably from 600 to 3000, g/mol.

From 0 to 5, preferably from 0.01 to 4 mol%, particularly preferably from 0.05 to 4 mol%, based on component (a1), of at least one compound D with at least three groups capable of ester formation are used according to the invention.

The compounds D preferably contain three to ten functional groups capable of forming ester linkages. Particularly preferred compounds D have three to six functional groups of this type in the molecule, in particular three to six hydroxyl groups and/or carboxyl groups. Examples which may be mentioned are:

tartaric acid, citric acid, malic acid;
trimethylolpropane, trimethylolethane;
pentaerythritol;
polyethertriols;
glycerol;
trimesic acid;
trimellitic acid or anhydride;
pyromellitic acid or dianhydride and
hydroxyisophthalic acid.

When compounds/D which have a boiling point below 200° C. are used in the preparation of the polyether esters P1, a proportion may distil out of the polycondensation mixture before the reaction. It is therefore preferred to add these compounds in an early stage of the process, such as the transesterification or esterification stage, in order to avoid this complication and in order to achieve the maximum possible uniformity of their distribution within the polycondensate.

In the case of compounds D which boil above 200° C., they can also be employed in a later stage of the process.

By adding the compound D it is possible, for example, to alter the melt viscosity in a desired manner, to increase the impact strength and to reduce the crystallinity of the polymers or molding compositions according to the invention.

The preparation of the biodegradable polyether esters P1 is known in principle (Sorensen and Campbell, Preparative Methods of Polymer Chemistry, Interscience Publishers, Inc., New York, 1961, pages 111–127; Encycl. of Polym. Science and Eng., Vol. 12, 2nd Edition, John Wiley & Sons, 1988, pages 75–117; Kunststoff-Handbuch, Volume 3/1, Carl Hanser Verlag, Munich, 1992, pages 15–23 (Preparation of Polyesters); WO 92/13020; EP-A 568,593; EP-A 565,235; EP-A 28,687) so that details on this are superfluous.

Thus, for example, the reaction of dimethyl esters of component (a1) with component (a2) (transesterification) can be carried out at from 160 to 230° C. in the melt under atmospheric pressure, advantageously under an inert gas atmosphere.

In the preparation of the biodegradable polyether ester P1 it is advantageous to use a molar excess of component (a2) relative to component (a1), for example up to 2½ times, preferably up to 1.67 times.

The biodegradable polyether ester P1 is normally prepared with addition of suitable conventional catalysts such as metal compounds based on the following elements such as Ti, Ge, Zn, Fe, Mn, Co, Zr, V, Ir, La, Ce, Li, and Ca, preferably organometallic compounds based on these metals, such as salts of organic acids, alkoxides, acetylacetonates and the like, particularly preferably based on zinc, tin and titanium.

When dicarboxylic acids or anhydrides thereof are used as component (a1), esterification thereof with component (a2) can take place before, at the same time as or after the transesterifidation. For example, the process described in DE-A 23 26 026 for preparing modified polyalkylene terephthalates can be used.

After the reaction of components (a1) and (a2), the polycondensation is carried out as far as the desired molecular weight, taking account of the molar ratio of carboxyl end groups to hydroxyl end groups, which is chosen to be greater than one, preferably greater than 2, as a rule under reduced pressure or in a stream of inert gas, for example of nitrogen, with further heating to from 180 to 260° C.

The desired end-group ratio can be adjusted
by an appropriate excess of component a1,
by an appropriately long polycondensation time with simultaneous removal of the diol in the case of excess component a2, or
by adding an appropriate amount of polyfunctional carboxylic acids or derivatives thereof, preferably dicarboxylic anhydrides such as succinic anhydride, phthalic anhydride, pyromellitic anhydride or trimellitic anhydride, if the polyether ester P1 predominantly has hydroxyl end groups owing to use of an excess of component a2.

In order to prevent unwanted degradation and/or side reactions, it is also possible in this stage of the process if required to add stabilizers (see EP-A 21 042 and U.S. Pat. No. 4,321,341). Examples of such stabilizers are the phosphorus compounds described in EP-A 13 461, U.S. Pat. No. 4,328,049 or in B. Fortunato et al., Polymer Vol. No. 18, pages 4006–4010, 1994, Butterworth-Heinemann Ltd. These may also in some cases act as inactivators of the catalysts described above. Examples which may be mentioned are: organophosphites, phosphonous acid and phosphorous acid. Examples of compounds which act only as stabilizers are: trialkyl phosphites, triphenyl phosphite, trialkyl phosphates, triphenyl phosphate and tocopherol (obtainable as Uvinul® 2003AO (BASF) for example).

On use of the biodegradable copolymers according to the invention, for example in the packaging sector, eg. for foodstuffs, it is as a rule desirable to select the lowest possible content of catalyst employed and not to employ any toxic compounds. In contrast to other heavy metals such as lead, tin, antimony, cadmium, chromium, etc., titanium and zinc compounds are non-toxic as a rule (Sax Toxic Substance Data Book, Shizuo Fujiyama, Maruzen, K. K., 360 S. (cited in EP-A 565,235), see also Römpp Chemie Lexikon Vol. 6, Thieme Verlag, Stuttgart, New York, 9th Edition, 1992, pages 4626–4633 and 5136–5143). Examples which may be mentioned are: dibutoxydiacetoacetoxytitanium, tetrabutyl orthotitanate and zinc(II) acetate.

The ratio by weight of catalyst to biodegradable polyether ester P1 is normally in the range from 0.01:100 to 3:100, preferably from 0.05:100 to 2:100, it also being possible to employ smaller quantities, such as 0.0001:100, in the case of highly active titanium compounds.

The catalyst can be employed right at the start of the reaction, directly shortly before the removal of the excess diol or, if required, also distributed in a plurality of portions during the preparation of the biodegradable polyether esters P1. It is also possible if required to employ different catalysts or mixtures thereof.

The biodegradable polyether esters P2 according to the invention have a molecular weight ($M_n$) in the range from 5000 to 80,000, preferably from 6000 to 45,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polyether ester P2 at 25° C.) and a melting point in the range from 50 to 235, preferably from 60 to 235, ° C., and have both hydroxyl and carboxyl end groups, with the molar ratio of carboxyl end groups to hydroxyl end groups being chosen to be greater than one, preferably greater than two.

The biodegradable polyether esters P2 are obtained according to the invention by reacting a mixture essentially comprising b1) a mixture essentially comprising
20–95, preferably from 25 to 80, particularly preferably from 30 to 70, mol% of adipic acid or ester-forming derivatives thereof or mixtures thereof,
5–80, preferably from 20 to 75, particularly preferably from 30 to 70, mol% of terephthalic acid or ester-forming derivatives thereof or mixtures thereof, and
0–5, preferably from 0 to 3, particularly preferably from 0.1 to 2, mol% of a compound containing sulfonate groups,
where the total of the individual mole percentages is 100 mol%,
(b2) a mixture of dihydroxy compounds (a2),
where the molar ratio of (b1) to (b2) is chosen in the range from 0.4:1 to 1.25:1, preferably from 0.6:1 to 1.25:1,
(b3) from 0.01 to 100, preferably from 0.1 to 80, % by weight, based on component (b1), of a hydroxy carboxylic acid B1, and
(b4) from 0 to 5, preferably from 0 to 4, particularly preferably from 0.01 to 3.5, mol%, based on component (b1), of compound D,
where the hydroxy carboxylic acid B1 is defined by the formulae IIa or IIb

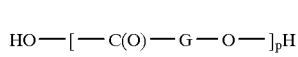

IIa

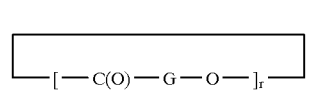

IIb where p is an integer from 1 to 1500, preferably from 1 to 1000, and r is 1, 2, 3 or 4, preferably 1 and 2, and G is a radical selected from the group consisting of phenylene, —$(CH_2)_k$—, where k is an integer from 1, 2, 3, 4 or 5, preferably 1 and 5, —C(R)H— and —C(R)HCH$_2$, where R is methyl or ethyl.

The biodegradable polyether esters P2 are expediently prepared in a similar way to the preparation of the polyether esters P1, it being possible to add the hydroxy carboxylic acid B1 both at the start of the reaction and after the esterification or transesterification stage.

In a preferred embodiment, the hydroxy carboxylic acid B1 such as glycolic acid, D-, L- or D,L-lactic acid, 6-hydroxyhexanoic acid, the cyclic derivatives thereof such as glycolide (1,4-dioxane-2,5-dione), D- or L-dilactide (3,6- dimethyl-1,4-dioxane-2,5-dione), p-hydroxybenzoic acid and oligomers and polymers such as poly-3-hydroxybutyric acid, polyhydroxyvaleric acid, polylactide (obtainable as EcoPLA® (from Cargill) for example) and a mixture of poly-3-hydroxybutyric acid and polyhydroxyvaleric acid (obtainable under the name Biopol® from Zeneca for example), the low molecular weight and cyclic derivatives thereof are particularly preferably employed for preparing polyether esters P2.

The biodegradable polyether esters Q1 according to the invention have a molecular weight ($M_n$) in the range from 5000 to 100,000, preferably from 8000 to 80,000, a viscosity number in the range from 30 to 450, preferably from 50 to 400 g/ml (measured in o-dichlorobenzene/phenol (50/50 ratio by weight) at a concentration of 0.5% by weight of polyether ester Q1 at 25° C.), and a melting point in the range from 50 to 235, preferably from 60 to 235, ° C., and have both hydroxyl and carboxyl end groups, with the molar ratio of carboxyl end groups to hydroxyl end groups being chosen to be greater than one, preferably greater than two.

The polyether esters Q1 are obtained according to the invention by reacting a mixture essentially comprising
(c1) polyether ester P1,
(c2) 0.01–50, preferably from 0.1 to 40,% by weight, based on (c1), of hydroxy carboxylic acid B1 and
(c3) 0–5, preferably from 0 to 4, mol%, based on component (a1) from the preparation of P1, of compound D.

The reaction of the polyether esters P1 with the hydroxy carboxylic acid B1, if required in the presence of compound D, preferably takes place in the melt at from 120 to 260° C. under an inert gas atmosphere, if desired also under reduced pressure. The procedure can be both batchwise and continuous, for example in stirred vessels or (reaction) extruders.

The reaction rate can, if required, be increased by adding conventional transesterification catalysts (see those described hereinbefore for the preparation of the polyether esters P1).

A preferred embodiment relates to polyether esters Q1 with block structures formed from components P1 and B1: when cyclic derivatives of B1 (compounds IIb) are used it is possible in the reaction with the biodegradable polyether ester P1 to obtain, by a ring-opening polymerization initiated by the end groups of P1, in a conventional way polyether esters Q1 with block structures (on the ring-opening polymerization, see Encycl. of Polym. Science and Eng. Volume 12, 2nd Edition, John Wiley & Sons, 1988, pages 1–75, in particular pages 36–41). The reaction can, if required, be carried out with addition of conventional catalysts like the transesterification catalysts described hereinbefore, and tin octanoate is particularly preferred (see also Encycl. of Polym. Science and Eng. Volume 12, 2nd Edition, John Wiley & Sons, 1988, pages 1–75, in particular pages 36–41).

When components B1 with higher molecular weights, for example with a p above 10 (ten) are used, it is possible to obtain, by reaction with the polyether esters P1 in stirred vessels or extruders, the desired block structures by the choice of the reaction conditions such as temperature, holdup time, addition of transesterification catalysts such as the abovementioned. Thus, J. of Appl. Polym. Sci., 32 (1986) 6191–6207 and Makromol. Chemie, 136 (1970) 311–313 disclose that in the reaction of polyether esters in the melt it is possible to obtain from a blend by transesterification reactions initially block copolymers and then random copolymers.

The biodegradable polyether esters Q2 according to the invention have a molecular weight ($M_n$) in the range from 6000 to 80,000, preferably from 8000 to 50,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polyether ester Q2 at 25° C.), and a melting point in the range from 50 to 200° C., preferably from 60 to 160° C., and have both hydroxyl and carboxyl end groups, with the molar ratio of carboxyl end groups to hydroxyl end groups being chosen to be greater than one, preferably greater than two.

The polyether esters Q2 are obtained according to the invention by reacting a mixture essentially comprising
(d1) from 95 to 99.9, preferably from 96 to 99.8, particularly preferably from 97 to 99.65, % by weight of polyether ester P1,
(d2) from 0.1 to 5, preferably 0.2–4, particularly preferably from 0.35 to 3, % by weight of a bisoxazoline C1 and
(d3) from 0 to 5, preferably from 0 to 4, mol%, based on component (a1) from the preparation of P1, of compound D.

According to observations to date, all conventional bisoxazolines can be used as bisoxazolines C1. Appropriate bisoxazolines are described, for example, in DE-A 39 15 874 (commercially available under the name Loxamid®). Further bisoxazolines are described in WO 94/03523 (PCT/EP 93/01986).

Particularly preferred bisoxazolines C1 are bisoxazolines of the general formula III

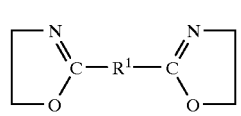

The bisoxazolines C1 of the general formula III (component d2) are generally obtainable by the process of Angew. Chem. Int. Edit. 11 (1972), 287–288. Particularly preferred bisoxazolines are those where $R^1$ is a single bond, a $(CH_2)_q$ alkylene group with q=2, 3 or 4, such as methylene, ethane-1,2-diyl, propane-1,3-diyl, propane-1,2-diyl, butane-1,4-diyl or a phenylene group. Particularly preferred bisoxazolines which may be mentioned are 2,2'-bis(2-oxazoline), bis(2-oxazolinyl)methane, 1,2-bis(2-oxazolinyl)ethane, 1,3-bis(2-oxazolinyl)propane, 1,4-bis(2-oxazolinyl)butane, 1,4-bis(2-oxazolinyl)benzene, 1,2-bis(2-oxazolinyl)benzene and 1,3-bis(2-oxazolinyl)benzene.

The polyether esters P1 are reacted with the bisoxazoline C1 preferably in the melt (see also: J. Appl. Polym. Science, 33 (1987) 3069–3079), it being necessary to take care that, if possible, no side reactions which may lead to crosslinking or gel formation occur. In a particular embodiment, the reaction is normally carried out at from 120 to 260, preferably from 130 to 240, particularly preferably 140–220, ° C., with the addition of the bisoxazoline advantageously taking place in a plurality of portions or continuously.

If required it is also possible to carry out the reaction of the polyether ester P1 with the bisoxazoline C1 in the presence of conventional inert solvents such as toluene, methyl ethyl ketone or dimethylformamide (DMF) or mixtures thereof, in which case the reaction is as a rule carried out at from 80 to 200, preferably from 90 to 150, ° C.

The reaction with the bisoxazoline C1 can be carried out batchwise or continuously, for example in stirred vessels, reaction extruders or through mixing heads.

Although the theoretical optimum for the reaction of P1 with bisoxazolines C1 is a molar ratio of oxazoline functionality to P1 carboxyl end group (polyether ester P1 with predominantly carboxyl end groups are particularly preferred) of 1:1, the reaction can also be carried out at molar ratios of from 1:3 to 1.5:1 without technical problems. With the molar ratios of >1:1, preferably >2:1, according to the invention it is possible, if desired, to add, during the reaction or else after the reaction, a dicarboxylic acid, preferably selected from the group consisting of adipic acid, succinic acid, terephthalic acid and isophthalic acid.

The biodegradable polymers T1 according to the invention have a molecular weight ($M_n$) in the range from 10,000 to 100,000, preferably from 11,000 to 80,000, preferably from 11,000 to 50,000, g/mol, a viscosity number in the range from 30 to 450, preferably from 50 to 400, g/ml (measured in o-dichlorobenzene/phenol (50/50 ratio by weight) at a concentration of 0.5% by weight of polymer T1 at 25° C.) and a melting point in the range from 50 to 235, preferably from 60 to 235, ° C.

The biodegradable polymers T1 are obtained according to the invention by reacting a polyether ester Q1 as claimed in claim 3 with (e1) 0.1–5, preferably from 0.2 to 4, particularly preferably from 0.3 to 3,% by weight, based on the polyether ester Q1, of bisoxazoline C1 and with (e2) 0–5, preferably from 0 to 4, mol%, based on component (a1) from the preparation of P1 and polyether ester Q1, of compound D.

This normally results in a chain extension, with the resulting polymer chains preferably having a block structure.

The reaction is, as a rule, carried out in a similar way to the preparation of the polyether esters Q2.

The biodegradable polymers T2 according to the invention have a molecular weight ($M_n$) in the range from 10,000 to 100,000, preferably from 11,000 to 80,000, particularly preferably from 11,000 to 50,000, g/mol, a viscosity number in the range from 30 to 450, preferably from 50 to 400, g/ml (measured in o-dichlorobenzene/phenol (50/50 ratio by weight) at a concentration of 0.5% by weight of polymer T2 at 25° C.) and a melting point in the range from 50 to 235, preferably from 60 to 235, ° C.

The biodegradable polymers T2 are obtainable according to the invention by reacting the polyether ester Q2 with (f1) 0.01–50, preferably from 0.1 to 40, % by weight, based on the polyether ester Q2, of the hydroxy carboxylic acid B1 and with (f2) 0–5, preferably from 0 to 4, mol%, based on component (a1) from the preparation of polyether ester Q2 via the polyether ester P1, of compound D, the procedure expediently being similar to the reaction of polyether ester P1 with hydroxy carboxylic acid B1 to give polyether ester Q1.

The biodegradable polymers T3 according to the invention have a molecular weight ($M_n$) in the range from 10,000 to 100,000, preferably from 11,000 to 80,000 g/mol, a viscosity number in the range from 30 to 450, preferably from 50 to 400, g/ml (measured in o-dichlorobenzene/phenol (50/50 ratio by weight) at a concentration of 0.5% by weight of polymer T3 at 25° C.) and a melting point in the range from 50 to 235, preferably from 60 to 235, ° C.

The biodegradable polymers T3 are obtained according to the invention by reacting (g1) polyether ester P2, or (g2) a mixture essentially comprising polyether ester P1 and 0.01–50, preferably from 0.1 to 40, % by weight, based on the polyether ester P1, of hydroxy carboxylic acid B1, or (g3) a mixture essentially comprising polyether esters P1 which differ from one another in composition, with 0.1–5, preferably from 0.2 to 4, particularly preferably from 0.3 to 2.5,% by weight, based on the quantity of polyether esters employed, of bisoxazoline C1 and with 0–5, preferably from 0 to 4, mol%, based on the respective molar quantities of component (a1) employed to prepare the polyether esters (g1) to (g3) employed, of compound D, expediently carrying out the reactions in a similar way to the preparation of the polyether esters Q2 from the polyether esters P1 and the bisoxazolines C1.

In a preferred embodiment, polyether esters P2 whose repeating units are randomly distributed in the molecule are employed. However, it is also possible to employ polyether esters P2 whose polymer chains have block structures. Polyether esters P2 of this type can generally be obtained by appropriate choice, in particular of the molecular weight, of the hydroxy carboxylic acid B1. Thus, according to observations to date there is generally only incomplete transesterification when a high molecular weight hydroxy carboxylic acid B1is used, in particular with a p above 10, for example even in the presence of the inactivators described above (see J. of Appl. Polym. Sci. 32 (1986) 6191–6207 and Makromol. Chemie, 136 (1970) 311–313). If required, the reaction can also be carried out in solution using the solvents mentioned for the preparation of the polymers T1 from the polyether esters Q1 and the bisoxazolines C1.

The biodegradable thermoplastic molding compositions T4 are obtained according to the invention by mixing in a conventional way, preferably with the addition of conventional additives such as stabilizers, processing aids, fillers etc. (see J. of Appl. Polym. Sci., 32 (1986) 6191–6207; WO 92/0441; EP 515,203; Kunststoff-Handbuch, Vol. 3/1, Carl Hanser Verlag Munich, 1992, pages 24–28)

(h1) 99.5–0.5% by weight of polyether ester Q2 with (h2) 0.5–99.5% by weight of hydroxy carboxylic acid B1.

In a preferred embodiment, high molecular weight hydroxy carboxylic acids B1 such as polycaprolactone or polylactide (eg. EcoPLA®) or polyglycolide or polyhydroxyalkanoates such as poly-3-hydroxybutyric acid, polyhydroxyvaleric acid and mixtures thereof (eg. Biopol®) with a molecular weight ($M_n$) in the range from 10,000 to 150,000, preferably from 10,000 to 100,000, g/mol are employed.

WO 92/0441 and EP-A 515 203 disclose that high molecular weight polylactide without added plasticizers is too brittle for most applications. It is possible in a preferred embodiment to prepare a blend starting from 0.5–20, preferably from 0.5 to 10, % by weight of polyether ester P1 as claimed in claim 1 or polyether ester Q2 as claimed in claim 4 and 99.5–80, preferably from 99.5 to 90, % by weight of polylactide, which displays a distinct improvement in the mechanical properties, for example an increase in the impact strength, compared with pure polylactide.

Another preferred embodiment relates to a blend obtainable by mixing from 99.5 to 40, preferably from 99.5 to 60, % by weight of polyether ester P1 as claimed in claim 1 or polyether ester Q2 as claimed in claim 4 and from 0.5 to 60, preferably from 0.5 to 40, % by weight of a high molecular weight hydroxy carboxylic acid B1, particularly preferably polylactide (eg. EcoPLA®), polyglycolide, poly-3-hydroxybutyric acid, polyhydroxyvaleric acid and mixtures thereof (eg. Biopol®), and polycaprolactone. Blends of this type are completely biodegradable and, according to observations to date, have very good mechanical properties.

According to observations to date, the thermoplastic molding compositions T4 according to the invention are preferably obtained by observing short mixing times, for example when carrying out the mixing in an extruder. It is also possible to obtain molding compositions which have predominantly blend structures by choice of the mixing parameters, in particular the mixing time and, if required, the use of inactivators, ie. it is possible to control the mixing process so that transesterification reactions can also take place at least partly.

In another preferred embodiment it is possible to replace 0–50, preferably 0–30, mol% of the adipic acid or the ester-forming derivatives thereof or the mixtures thereof with at least one other aliphatic $C_4$–$C_{10}$- or cycloaliphatic $C_5$–$C_{10}$-dicarboxylic acid or dimer fatty acid such as succinic acid, glutaric acid, pimelic acid, suberic acid, azelaic acid or sebacic acid or an ester derivative such as the di-$C_1$–$C_6$-alkyl esters thereof or the anhydrides thereof such as succinic anhydride, or mixtures thereof, preferably succinic acid, succinic anhydride, sebacic acid, dimer fatty acid and di-$C_1$–$C_6$-alkyl esters such as dimethyl, diethyl, di-n-propyl, diisobutyl, di-n-pentyl, dineopentyl, di-n-hexyl esters thereof, especially dimethyl succinate.

A particularly preferred embodiment relates to the use as component (a1) of the mixture, described in EP-A 7445, of succinic acid, adipic acid and glutaric acid and the $C_1$–$C_6$-alkyl esters thereof such as dimethyl, diethyl, di-n-propyl, diisobutyl, di-n-pentyl, dineopentyl, di-n-hexyl esters, especially the dimethyl esters and diisobutyl esters thereof.

In another preferred embodiment it is possible to replace 0–50, preferably 0–40, mol% of the terephthalic acid or the ester-forming derivatives thereof, or the mixtures thereof, with at least one other aromatic dicarboxylic acid such as isophthalic acid, phthalic acid or 2,6-naphthalenedicarboxylic acid, preferably isophthalic acid, or an ester derivative such as a di-$C_1$–$C_6$-alkyl ester such as dimethyl, diethyl, di-n-propyl, diisobutyl, di-n-pentyl, dineopentyl, di-n-hexyl ester, in particular a dimethyl ester, or mixtures thereof.

It should be noted in general that the various polymers according to the invention can be worked up in a conventional way by isolating the polymers or, in particular if it is wished to react the polyether esters P1, P2, Q1 and Q2 further, by not isolating the polymers but immediately processing them further.

The polymers according to the invention can be applied to coating substrates by rolling, spreading, spraying or pouring. Preferred coating substrates are those which are compostable or rot such as moldings of paper, cellulose or starch.

The polymers according to the invention can also be used to produce moldings which are compostable. Moldings which may be mentioned by way of example are: disposable articles such as crockery, cutlery, refuse sacks, sheets for agriculture to advance harvesting, packaging sheets and vessels for growing plants.

It is furthermore possible to spin the polymers according to the invention into threads in a conventional way. The threads can, if required, be stretched, stretch-twisted, stretch-wound, stretch-warped, stretch-sized and stretch-texturized by customary methods. The stretching to flat yarn can moreover take place in the same working step (fully drawn yarn or fully oriented yarn) or in a separate step. The stretch warping, stretch sizing and stretch texturizing are generally carried out in a working step separate from the spinning. The threads can be further processed to fibers in a conventional way. Sheet-like structures can then be obtained from the fibers by weaving or knitting.

The moldings, coating compositions and threads etc. described above can, if required, also contain fillers which can be incorporated during the polymerization process at any stage or subsequently, for example in a melt of the polymers according to the invention.

It is possible to add from 0 to 80% by weight of fillers, based on the polymers according to the invention. Examples of suitable fillers are carbon black, starch, lignin powder, cellulose fibers, natural fibers such as sisal and hemp, iron oxides, clay minerals, ores, calcium carbonate, calcium sulfate, barium sulfate and titanium dioxide. The fillers can in some cases also contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids such as calcium and zinc stearate, and montan waxes. Such stabilizers etc. are described in detail in Kunststoff-Handbuch, Vol. 3/1, Carl Hanser Verlag, Munich, 1992, pages 24–28.

The polymers according to the invention can additionally be colored in any desired way by adding organic or inorganic dyes. The dyes can also in the widest sense be regarded as filler.

A particular application of the polymers according to the invention relates to the use as compostable sheet or a compostable coating as outer layer of diapers. The outer layer of the diapers effectively prevents penetration by liquids which are absorbed inside the diaper by the fluff and superabsorbers, preferably by biodegradable superabsorbers, for example based on crosslinked polyacrylic acid or crosslinked polyacrylamide. It is possible to use a web of a cellulose material as inner layer of the diaper. The outer layer of the described diapers is biodegradable and thus compostable. It disintegrates on composting so that the entire diaper rots, whereas diapers provided with an outer layer of, for example, polyethylene cannot be composted without previous reduction in size or elaborate removal of the polyethylene sheet.

Another preferred use of the polymers and molding compositions according to the invention relates to the production of adhesives in a conventional way (see, for example, Encycl. of Polym. Sc. and Eng. Vol.1, "Adhesive Compositions", pages 547–577). The polymers and molding compositions according to the invention can also be processed as disclosed in EP-A 21 042 using suitable tackifying thermoplastic resins, preferably natural resins, by the methods described therein. The polymers and molding compositions according to the invention can also be further processed as disclosed in DE-A 4 234 305 to solvent-free adhesive systems such as hot melt sheets.

Another preferred application relates to the production of completely degradable blends with starch mixtures (preferably with thermoplastic starch as described in WO 90/05161) in a similar process to that described in DE-A 42 37 535. The polymers and thermoplastic molding compositions according to the invention can, according to observations to date, because of their hydrophobic nature, their mechanical properties, their complete biodegradability, their good compatibility with thermoplastic starch and not least because of their favorable raw material basis, advantageously be employed as synthetic blend component.

Further applications relate, for example, to the use of the polymers according to the invention in agricultural mulch, packaging material for seeds and nutrients, substrate in adhesive sheets, baby pants, pouches, bed sheets, bottles, boxes, dust bags, labels, cushion coverings, protective clothing, hygiene articles, handkerchiefs, toys and wipes.

Another use of the polymers and molding compositions according to the invention relates to the production of foams, generally by conventional methods (see EP-A 372,846; Handbook of Polymeric foams and Foam Technology, Hanser Publisher, Munich, 1991, pages 375–408). This normally entails the polymer or molding composition according to the invention being initially melted, if required with the addition of up to 5% by weight of compound D, preferably pyromellitic dianhydride and trimellitic anhydride, then a blowing agent being added and the resulting mixture being exposed to reduced pressure by extrusion, resulting in foaming.

The advantages of the polymers according to the invention over known biodegradable polymers are a favorable raw material basis with readily available starting materials such as adipic acid, terephthalic acid and conventional diols, interesting mechanical properties due to the combination of "hard" (owing to the aromatic dicarboxylic acids such as terephthalic acid) and "soft" (owing to the aliphatic dicarboxylic acids such as adipic acid) segments in the polymer chain and the variation in uses due to simple modifications, a satisfactory degradation by microorganisms, especially in compost and soil, and a certain resistance to microorganisms in aqueous systems at room temperature, which is particularly advantageous for many applications. The random incorporation of the aromatic dicarboxylic acids of components (a1) in various polymers makes the biological attack possible and thus achieves the desired biodegradability.

A particular advantage of the polymers according to the invention is that it is possible by tailoring the formulations to optimize both the biodegradation and the mechanical properties for the particular application.

It is furthermore possible depending on the preparation process advantageously to obtain polymers with predominantly random distribution of monomer units, polymers with predominantly block structures and polymers with predominantly blend structure or blends.

EXAMPLES

Enzyme Assay

The polymers were cooled with liquid nitrogen or dry ice and finely ground in a mill (the rate of enzymatic degradation increases with the surface area of the ground material). For the actual enzyme assay, 30 mg of finely ground polymer powder and 2 ml of a 20 mmol/l aqueous $K_2HPO_4$/$KH_2PO_4$ buffer solution (pH: 7.0) were placed in an Eppendorf tube (2 ml) and equilibrated on a rotator at 37° C. for 3 h. Subsequently 100 units of lipase from either *Rhizopus arrhizus, Rhizopus delemar* or *Pseudomonas pl.* were added, and incubation was carried out on the rotator at 250 rpm and 37° C. for 16 h. The reaction mixture was then filtered through a Millipore® membrane (0.45 μm), and the DOC (dissolved organic carbon) of the filtrate was measured. Similar DOC measurements were carried out only with buffer and enzyme (as enzyme control) and only with buffer and sample (as blank).

The ΔDOC values (DOC(sample+enzyme)–DOC (enzyme control)–DOC(blank)) found can be regarded as a measure of the enzymatic degradability of the samples. They are shown in each case comparing with a measurement with powdered polycaprolactone® Tone P 787 (Union Carbide). It should be noted in the assessment that these are not absolutely quantifiable data. The connection between the surface area of the ground material and the rate of enzymatic degradation has been pointed out above. Furthermore, the enzyme activities may also vary.

The molecular weights were measured by gel permeation chromatography (GPC):

Stationary phase: 5 MIXED B polystyrene gel columns (7.5×300 mm, PL gel 10 μ) from Polymer Laboratories; equilibration: 35° C.

Mobile phase: Tetrahydrofuran (flow rate: 1.2 ml/min)

Calibration: Molecular weight 500–10000000 g/mol with PS calibration kit from Polymer Laboratories.

In the oligomer range ethylbenzene/1,3-diphenylbutane/1,3,5-triphenylhexane/1,3,5,7-tetraphenyloctane/1,3,5,7,9-pentaphenyldecane Detection: RI (refractive index) Waters 410 UV (at 254 nm) Spectra Physics 100

The hydroxyl number (OH number) and acid number (AN) were determined by the following methods:

(a) Determination of the apparent hydroxyl number 10 ml of toluene and 9.8 ml of acetylation reagent (see below) were added to about 1 to 2 g of accurately weighed test substance, and the mixture was heated at 95° C. with stirring for 1 h. Then 5 ml of distilled water were added. After cooling to room temperature, 50 ml of tetrahydrofuran (THF) were added and potentiographic titration was carried out with standard ethanolic KOH solution to the turning point.

The test was repeated without test substance (blank sample).

The apparent OH number was then calculated from the following formula:

apparent OH number cxtx56.1(V2–V1)/m (in mg KOH/g)

where c=amount of substance concentration of the standard ethanolic KOH solution in mol/l, t=titer of the standard ethanolic KOH solution m=weight of test substance in mg V1=ml of standard solution used with test substance V2=ml of standard solution used without test substance.

Reagents used:

standard ethanolic KOH solution, c=0.5 mol/l, titer 0.9933 (Merck, Cat. No. 1.09114)

acetic anhydride, analytical grade (Merck, Cat. No. 42)

pyridine, analytical grade (Riedel de Haen, Cat. No. 33638)

acetic acid, analytical grade (Merck, Cat. No. 1.00063)

acetylation reagent: 810 ml of pyridine, 100 ml of acetic anhydride and 9 ml of acetic acid water, deionized THF and toluene b) Determination of the acid number (AN)

About 1 to 1.5 g of test substance were accurately weighed and mixed with 10 ml of toluene and 10 ml of pyridine and then heated to 95° C. After a solution was obtained it was cooled to room temperature, 5 ml of water and 50 ml of THF were added, and titration was carried out with 0.1 N standard ethanolic KOH solution.

The determination was repeated without test substance (blank sample).

The acid number was then calculated from the following formula:

AN=cxtx56.1(V1–V2)/m (in mg KOH/g)

where c=amount of substance concentration of the standard ethanolic KOH solution in mol/l, t=titer of the standard ethanolic KOH solution m=weight of test substance in mg V1=ml of standard solution used with test substance V2=ml of standard solution used without test substance.

Reagents used:
standard ethanolic KOH solution, c=0.1 mol/l, titer=0.9913 (Merck, Cat. No. 9115)

pyridine, analytical grade (Riedel de Haen, Cat. No. 33638)

water, deionized

THF and toluene (c) Determination of the OH number

The OH number is obtained from the sum of the apparent OH number and the AN:

OH number=apparent OH number+AN

Abbreviations used:

DOC: dissolved organic carbon

DMT: dimethyl terephthalate

PCL: polycaprolactone Tone P 787 (Union Carbide)

PMDA: pyromellitic dianhydride

AN: acid number

TBOT: tetrabutyl orthotitanate

VN: viscosity number (measured in o-dichlorobenzene/phenol (50/50 ratio by weight) at a concentration of 0.5% by weight of polymer at 25° C.)

$T_m$: "melting temperature"=temperature at which a maximum endothermic heat flux occurs (extreme of the DSC plots)

$T_g$: glass transition temperature (midpoint of the DSC plots)

The DSC measurements were carried out with a DuPont 912 + thermal analyzer 990 DSC apparatus. The temperature and enthalpy calibration took place in a conventional way. The sample weight was typically 13 mg. The heating and cooling rates were, unless otherwise noted, 20 K/min. The samples were measured under the following conditions: 1. heating run on samples in the state as supplied, 2. rapid cooling from the melt, 3. heating run on samples cooled from the melt (samples from 2). The second DSC runs in each case allowed comparison between the different samples after a uniform thermal history.

Example 1

Preparation of a Polyether Ester P1

(a) 4672 kg of 1,4-butanediol, 7000 kg of adipic acid and 50 g of tin dioctoate were reacted at a temperature in the range from 230 to 240° C. under a nitrogen atmosphere. After most of the water formed in the reaction had been removed by distillation, 10 g of TBOT were added to the reaction mixture. After the acid number had fallen below 1, excess 1,4-butanediol was distilled out under reduced pressure until the OH number reached 56.

(b) 2500 g of the polymer from Example 1(a), 5.6 kg of DMT, 5.6 kg of 1,4-butanediol, 60 kg of PMDA, 6.22 kg of polyethylene glycol (with molecular weight of 600 g/mol; Systol® T 122) and 20 g of TBOT were introduced into a stirrer vessel and heated, while stirring slowly under a nitrogen atmosphere, to 180° C. During this, the methanol formed in the transesterification reaction was distilled out. The mixture was heated to 230° C. over the course of 3 h while increasing the stirring speed and, after a further hour, 8 g of 50% by weight aqueous phosphorous acid were added. The pressure was reduced to 5 mbar over the course of 2 h and was then kept at <2 mbar and 240° C. for 2.5 h, during which the excess diol distilled out.

OH number: 2 mg KOH/g

AN: 4.5 mg KOH/g

VN: 112 g/ml $T_m$: 108° C.; $T_g$=−45° C. (DSC, state as supplied)

Example 2

Preparation of a Polyether Ester Q2

12.4 g of the bisoxazoline bis(2-ricinoleyl-2-oxazoline) tetra-methylxylene diurethane (Loxamid® VEP 8523 from Henkel, a bisoxazoline from ricinoleyloxazoline and 4,4'-diphenylmethane diisocyanate, preparable as disclosed in DE-A 39 15 874) were added dropwise over the course of 25 min to 300 g of the copolyether ester from Example 1 while stirring under a nitrogen atmosphere at 200° C., during which the melt viscosity increased and the product became brownish.

OH number: 3 mg KOH/g

AN: 2 mg KOH/g

Enzyme assay with *Rhizopus arrhizus:* ΔDOC: 126 mg/l; for comparison with PCL: ΔDOC: 2588 mg/l.

Example 3

Preparation of Another Polyether Ester Q2

3.5g of the bisoxazoline 1,4-bis(2-oxazolinyl)butane were added dropwise over the course of 25 min to 300 g of the copolyether ester from Example 1 while stirring under a nitrogen atmosphere at 200° C., during which the melt viscosity increased and the product became brownish.

OH number: 3 mg KOH/g

AN: 2 mg KOH/g $T_m$: 112° C.; $T_g$=−42° C. (DSC in the state as supplied)

Enzyme assay with *Rhizopus arrhizus:* ΔDOC: 143 mg/l; for comparison with PCL: ΔDOC: 2588 mg/l.

We claim:

1. A biodegradable polyether ester Q2 having a molecular weight ($M_n$) of from 6000 to 80,000 g/mol, a viscosity number of from 30 to 450 g/ml (measured in o-dichlorobenzene/phenol (50/50 ratio by weight) at a concentration of 0.5% by weight of polyether ester Q2 at 25° C.), and a melting point of from 50 to 200° C., which is obtained by reacting a mixture essentially comprising ($d_1$) from 95 to 99.9% by weight of a polyether ester P1 which has a molecular weight ($M_n$) of from 5000 to 80,000 g/mol, a viscosity number of from 30 to 450 g/ml (measured in o-dichlorobenzene/phenol (50/50 ratio by weight) at a concentration of 0.5% by weight of polyether ester P1 at 25° C.), and a melting point of from 50 to 200° C., and which has both hydroxyl and carboxyl end groups, where the molar ratio of carboxyl end groups to hydroxyl end groups is greater than one, and where P1 is obtained by reacting a mixture essentially comprising ($a_1$) a mixture essentially comprising 20–95 mol% of adipic acid or ester-forming derivatives thereof or mixtures thereof, 5–80 mol% of terephthalic acid or ester-forming derivatives thereof or mixtures thereof, and 0–5 mol% of a compound containing sulfonate groups, where the total of the individual mole percentages is 100 mol%, and ($a_2$) a mixture of dihydroxy compounds essentially comprising ($a_{2_1}$) from 15 to 99.8 mol% of a dihydroxy compound selected from the group consisting of $C_2$–$C_6$-alkanediols and $C_5$–$C_{10}$-cycloalkanediols, ($a_{2_2}$) from 85 to 0.2 mol% of a dihydroxy compound of the formula I

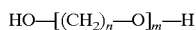

where n is 2, 3 or 4 and m is an integer from 2 to 250, or mixtures thereof, where the molar ratio of ($a_1$) to ($a_2$) is from 0.4:1 to 1.5:1, and ($a_3$) from 0 to 5 mol%, based on ($a_1$), of a compound D having at least three groups capable of ester formation, ($d_2$) from 0.1 to 5% by weight of a bisoxazoline C1, where the total of the individual mole percentages is 100 mol%, and ($d_3$) from 0 to 5 mol%, based on component ($a_1$) employed in the preparation of P1, of compound D.

2. A biodegradable polymer T2 having a molecular weight ($M_n$) of from 10,000 to 100,000 g/mol, a viscosity number of from 30 to 450 g/ml (measured in o-dichlorobenzene/phenol (50/50 ratio by weight) at a concentration of 0.5% by weight of polymer T2 at 25° C.), and a melting point of from 50 to 235° C., which is obtained by reacting a polyether ester Q2, as defined in claim 1, with ($f_1$) 0.01 to 50% by weight, based on the polyether ester Q2, of a hydroxy carboxylic acid B1 of the formula IIa or IIb

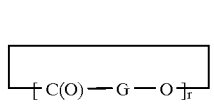

where p is an integer from 1 to 1500, r is an integer from 1 to 4, and G is a radical selected from the group consisting of phenylene, —$(CH_2)_k$—, where k is an integer from 1 to 5, —C(R)H— and —C(R)HCH$_2$—, where R is methyl or ethyl, and ($f_2$) 0 to 5 mol%, based on component ($a_1$) employed in the preparation of polyether Q2, of compound D having at least three groups capable of ester formation.

3. A biodegradable thermoplastic molding composition T4, which is obtained by mixing ($h_2$) a polyether ester Q2, as defined in claim 1, with ($h_3$) 0.5 to 99.5% by weight of a hydroxy carboxylic acid B1 of the formula IIa or IIb

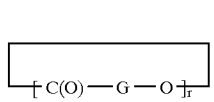

where p is an integer from 1 to 1500, r is an integer from 1 to 4, and G is a radical selected from the group consisting of phenylene, —$(CH_2)_k$—, where k is an integer from 1 to 5, —C(R)H— and —C(R)HCH$_2$—, where R is methyl or ethyl.

4. A process for preparing a biodegradable polymer T2 having a molecular weight ($M_n$) of from 10,000 to 100,000 g/mol, a viscosity number of from 30 to 450 g/ml (measured in o-dichlorobenzene/phenol (50/50 ratio by weight) at a concentration of 0.5% by weight of polymer T2 at 25° C.), and a melting point of from 50 to 235° C., which comprises in a first step preparing a polyether ester Q2, as defined in claim 1, and in a second step reacting polyether ester Q2 with ($f_2$) 0.01 to 50% by weight, based on the polyether ester Q2, of a hydroxy carboxylic acid B1 of the formula IIa or IIb

where p is an integer from 1 to 1500, r is an integer from 1 to 4, and G is a radical selected from the group consisting of phenylene, —$(CH_2)_k$—, where k is an integer from 1 to 5, —C(R)H— and —C(R)HCH$_2$—, where R is methyl or ethyl, and ($f_2$) 0 to 5 mol%, based on component ($a_1$) employed in the preparation of the polyether ester Q2, of compound D having at least three groups capable of ester formation.

5. A process for preparing a biodegradable thermoplastic molding composition T4, which comprises in a first step preparing a polyether ester Q2, as defined in claim 1, and in a second step mixing 99.5 to 0.5% by weight of Q2 with 0.5 to 99.5% by weight of a hydroxy carboxylic acid B1 of the formula IIa or IIb

where p is an integer from 1 to 1500, r is an integer from 1 to 4, and G is a radical selected from the group consisting of phenylene, —$(CH_2)_k$—, where k is an integer from 1 to 5, —C(R)H— and —C(R)HCH$_2$—, where R is methyl or ethyl.

6. The biodegradable polyether ester Q2 defined in claim 1, comprising from 0.2 to 4.0% by weight of the bisoxazoline C1.

7. The biodegradable polyether ester Q2 defined in claim 1, wherein the bisoxazoline C1 has the formula III

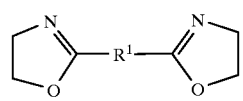

wherein $R^1$ is a single bond, a $(CH_2)_q$ alkylene group with q being 2, 3 or 4, or is a phenylene group.

8. The biodegradable polyether ester Q2 defined in claim 1, wherein the bisoxazoline C1 is selected from the group consisting of 2,2'-bis(2-oxazoline), bis(2-oxazolinyl)methane, 1,2-bis(2-oxazolinyl)ethane, 1,3-bis(2-oxazolinyl)propane, 1,4-bis(2-oxazolinyl)butane, 1,4-bis(2-oxazolinyl)

benzene, 1,2-bis(2-oxazolinyl)benzene and 1,3-bis(2-oxazolinyl)benzene.

9. The biodegradable polyether ester Q2 defined in claim 1, comprising from 0.01 to 4.0% by weight of compound D.

10. A compostable molding obtained from a polyether ester Q2 as defined in claim 1.

11. An adhesive obtained from a polyether ester Q2 as defined in claim 1.

12. A biodegradable blend obtained from a polyether ester Q2 as defined in claim 1.

13. A biodegradable foam obtained from a polyether ester Q2 as defined in claim 1.

14. A paper coating composition obtained from a polyether ester Q2 as defined in claim 1.

15. A biodegradable polymer T1 having
a molecular weight ($M_n$) of from 10,000 to 100,000 g/mol,
a viscosity number of from 30 to 450 g/ml (measured in o-dichlorobenzene/phenol (50/50 ratio by weight) at a concentration of 0.5% by weight of polymer T2 at 25° C.), and
a melting point of from 50 to 235° C.,
which is obtained by reacting a polyether ester Q1 which has
a molecular weight ($M_n$) of from 5,000 to 100,000 g/mol,
a viscosity number of from 30 to 450 g/ml (measured in o-dichlorobenzene/phenol (50/50 ratio by weight) at a concentration of 0.5% by weight of polyether ester Q1 at 250C.), and
a melting point of from 50 to 235° C.,
and which has both hydroxyl and carboxyl end groups, where the molar ratio of carboxyl end groups to hydroxyl end groups is greater than one, where Q1 is obtained by reacting a mixture essentially comprising
(c1) a polyether ester P1 which has
a molecular weight ($M_n$) of from 5000 to 80.000 g/mol,
a viscosity number of from 30 to 450 g/ml (measured in o-dichlorobenzene/phenol (50/50 ratio by weight) at a concentration of 0.5% by weight of polyether ester P1 at 25° C.), and
a melting point of from 50 to 200° C,
and which has both hydroxyl and carboxyl end groups, where the molar ratio of carboxyl end groups to hydroxyl end groups is greater than one, and where P1 is obtained by reacting a mixture essentially comprising
($a_1$) a mixture essentially comprising
20–95 mol% of adipic acid or ester-forming derivatives thereof or mixtures thereof,
5–80 mol% of terephthalic acid or ester-forming derivatives thereof or mixtures thereof, and
0–5 mol% of a compound containing sulfonate groups,
where the total of the individual mole percentages is 100 mol%, and
($a_2$) a mixture of dihydroxy compounds essentially comprising
($a_{21}$) from 15 to 99.8 mol% of a dihydroxy compound selected from the group consisting of $C_2$–$C_6$-alkanediols and $C_5$–$C_{10}$-cycloalkanediols,
($a_{22}$) from 85 to 0.2 mol% of a dihydroxy compound of the formula I

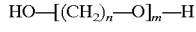

HO—[($CH_2$)$_n$—O]$_m$—H where n is 2, 3 or 4 and m is an integer from 2 to 250, or mixtures thereof,
where the molar ratio of ($a_1$) to ($a_2$) is from 0.4:1 to 1.5:1, and
($a_3$) from 0 to 5 mol%. based on ($a_1$), of a compound D having at least three groups capable of ester formation, ($c_2$) 0.01 to 50% by weight, based on ($c_1$), of a hydroxy carboxylic acid B1 of the formula IIa or IIb

(IIa)

HO—[C(O)—G—O]$_p$—H

(IIb)

[—C(O)—G—O—]$_r$ where p is an integer from 1 to 1500, r is an integer from 1 to 4, and G is a radical selected from the group consisting of phenylene, —($CH_2$)$_k$—, where k is an integer from 1 to 5, —C(R)H— and —C(R)H$CH_2$—, where R is methyl or ethyl, and ($C_3$) 0 to 5 mol%, based on component ($a_1$), employed in the preparation of P1, of compound D, with
($e_1$) 0.1 to 5% by weight, based on the polyether ester Q1, of a bisoxazoline C1, and
($e_2$) 0 to 5 mol%, based on component ($a_1$) employed in the preparation of the polyether ester Q1, of compound D.

16. A biodegradable polymer T3 having
a molecular weight ($M_n$) of from 10,000 to 100,000 g/mol,
a viscosity number of from 30 to 450 g/ml (measured in o-dichlorobenzene/phenol (50/50 ratio by weight) at a concentration of 0.5% by weight of polymer T3 at 25° C.), and
a melting point of from 50 to 235° C.,
which is obtained by reacting
($g_1$) a polyether ester P2 which has
a molecular weight ($M_n$) of from 5000 to 80,000 g/mol,
a viscosity number of from 30 to 450 g/ml (measured in o-dichlorobenzene/phenol (50/50 ratio by weight) at a concentration of 0.5% by weight of polyether ester P2 at 25° C.), and
melting point of from 50 to 235° C.,
and which has both hydroxyl and carboxyl end groups, where the molar ratio of carboxyl end groups to hydroxyl end groups is greater than one, and where P2 is obtained by reacting a mixture essentially comprising
($b_1$) a mixture essentially comprising
20 to 95 mol% of adipic acid or ester-forming derivatives thereof or mixtures thereof,
5 to 80 mol% of terephthalic acid or ester forming derivatives thereof or mixtures thereof, and
0 to 5 mol% of a compound containing sulfonate groups, where the total of the individual mole percentages is 100 mol%,
($b_2$) a mixture of dihydroxy compounds, essentially comprising
($a_{21}$) from 15 to 99.8 mol% of a dihydroxy compound selected from the group consisting of $C_2$–$C_6$-alkanediols and $C_5$–$C_{10}$-cycloalkanediols, and
($a_{22}$) from 85 to 0.2 mol% of a dihydroxy compound containing ether functionalities of the formula I

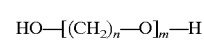

HO—[($CH_2$)$_n$—O]$_m$—H where n is 2, 3 or 4 and m is an integer from 2 to 250, or mixtures thereof,
where the molar ratio of ($b_1$) to ($b_2$) is of from 0.4:1 to 1.25:1,
($b_3$) from 0.01 to 100% by weight, based on component ($b_1$), of a hydroxy carboxylic acid B1 of the formula IIa or IIb

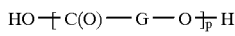

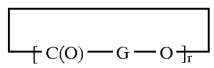

where p is an integer from 1 to 1500, r is an integer from 1 to 4, and G is a radical selected from the group consisting of phenylene, —(CH$_2$)$_k$—, where k is an integer from 1 to 5, —C(R)H— and —C(R)HCH$_2$—, where R is methyl or ethyl, and (b$_4$) from 0 to 5 mol%, based on component (b$_1$), of a compound D having at least three groups capable of ester formation, or (g$_2$) a mixture essentially comprising the polyether ester P1 which has a molecular weight (M$_n$) of from 5000 to 80.000 g/mol, a viscosity number of from 30 to 450 g/ml (measured in o-dichlorobenzene/phenol (50/50 ratio by weight) at a concentration of 0.5% by weight of polyether ester P1 at 25° C.), and a melting point of from 50 to 200° C., and which has both hydroxyl and carboxyl end groups, where the molar ratio of carboxyl end groups to hydroxyl end groups is greater than one, and where P1 is obtained by reacting a mixture essentially comprising (a$_1$) a mixture essentially comprising 20–95 mol% of adipic acid or ester-forming derivatives thereof or mixtures thereof, 5–80 mol% of terephthalic acid or ester-forming derivatives thereof or mixtures thereof, and 0–5 mol% of a compound containing sulfonate groups, where the total of the individual mole percentages is 100 mol%, and (a$_2$) a mixture of dihydroxy compounds essentially comprising (a$_{21}$) from 15 to 99.8 mol% of a dihydroxy compound selected from the group consisting of C$_2$–C$_6$-alkanediols and C$_5$–C$_{10}$-cycloalkanediols, (a$_{22}$) from 85 to 0.2 mol% of a dihydroxy compound of the formula I HO—[(CH$_2$)$_n$—O]$_m$—H where n is 2. 3 or 4 and m is an integer from 2 to 250, or mixtures thereof, where the molar ratio of (a$_1$) to (a$_2$) is from 0.4:1 to 1.5:1. and (a$_3$) from 0 to 5 mol%. based on (a$_1$), of a compound D having at least three groups capable of ester formation, and 0.01 to 50% by weight, based on P1, of the hydroxy carboxylic acid B1, or (g$_3$) a mixture essentially comprising polyether esters P1 which differ from one another in composition, with 0.1 to 5% by weight, based on the polyether ester (g$_1$), (g$_2$) or (g$_3$), of a bisoxazoline C1, and 0 to 5 mol%, based on component (a$_1$) or (b$_1$) employed in the preparation of the polyether ester (g$_1$), (g2) or (g$_3$), of compound D.

17. A process for preparing a biodegradable polyether ester Q2 having a molecular weight (M$_n$) of from 6000 to 80,000 g/mol, a viscosity number of from 30 to 450 g/ml (measured in o-dichlorobenzene/phenol (50/50 ratio by weight) at a concentration of 0.5% by weight of polyether ester Q2 at 25° C.), and a melting point of from 50 to 200° C., which comprises in a first step preparing (d$_1$) a polyether ester P1 which has a molecular weight (M$_n$) of from 5000 to 80,000 g/mol, a viscosity number of from 30 to 450 g/ml (measured in o-dichlorobenzene phenol (50/50 ratio by weight) at a concentration of 0.5% by weight of polyether ester P1 at 25° C.), and a melting point of from 50 to 200° C., and which had both hydroxyl and carboxy end groups, where the molar ratio of carboxyl end groups to hydroxyl end groups is greater than one, and where P1 is obtained by reacting a mixture essentially comprising (a$_1$) a mixture essentially comprising 20–95 mol% of adipic acid or ester-forming derivatives thereof or mixtures thereof, 5–80 mol% of terephthalic acid or ester-forming derivatives thereof or mixtures thereof, and 0–5 mol% of a compound containing sulfonate groups, where the total of the individual mole percentages is 100 mol%, and (a$_2$) a mixture of dihydroxy compounds essentially comprising (a$_{21}$) from 15 to 99.8 mol% of a dihydroxy compound selected from the group consisting of C$_2$–C$_6$-alkanediols and C$_5$–C$_{10}$-cycloalkanediols, (a$_{22}$) from 85 to 0.2 mol% of a dihydroxy compound of the formula I

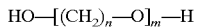

where n is 2. 3 or 4 and m is an integer from 2 to 250, or mixtures thereof, where the molar ratio of (a$_1$) to (a$_2$) is from 0.4:1 to 1.5:1. and (a$_3$) from 0 to 5 mol%. based on (a$_1$), of a compound D having at least three groups capable of ester formation, and in a second step reacting a mixture essentially comprising (d$_1$) with (d$_2$) from 0.1 to 5% by weight of a bisoxazoline C1, and (d$_3$) from 0 to 5 mol%, based on component (a$_1$) employed in the preparation of P1, of compound D.

18. A process for preparing a biodegradable polymer T1 having a molecular weight (M$_n$) of from 10,000 to 100,000 g/mol, a viscosity number of from 30 to 450 g/ml (measured in o-dichlorobenzene/phenol (50/50 ratio by weight) at a concentration of 0.5% by weight of polymer Ti at 25° C.), and a melting point of from 50 to 235° C., which comprises in a first step preparing a polyether ester Q1 which has a molecular weight (M$_n$) of from 5,000 to 100,000 g/mol, a viscosity number of from 30 to 450 g/ml (measured in o-dichlorobenzene/phenol (50/50 ratio by weight) at a concentration of 0.5% by weight of polyether ester Q1 at 25° C.), and a melting point of from 50 to 235° C., and which has both hydroxyl and carboxyl end groups, where the molar ratio of carboxyl end groups to hydroxyl end groups is greater than one, where Q1 is obtained by reacting a mixture essentially comprising ($c_1$) a polyether ester P1 which has
a molecular weight ($M_n$) of from 5000 to 80.000 g/mol,
a viscosity number of from 30 to 450 g/ml (measured in o-dichlorobenzene/phenol (50/50 ratio by weight) at a concentration of 0.5% by weight of polyether ester P1 at 25° C.), and
a melting point of from 50 to 200° C.,
and which has both hydroxyl and carboxyl end groups, where the molar ratio of carboxyl end groups to hydroxyl end groups is greater than one, and where P1 is obtained by reacting a mixture essentially comprising ($a_1$) a mixture essentially comprising
20–95 mol% of adipic acid or ester-forming derivatives thereof or mixtures thereof,
5–80 mol% of terephthalic acid or ester-forming derivatives thereof or mixtures thereof, and
0–5 mol% of a compound containing sulfonate groups,
where the total of the individual mole percentages is 100 mol% and ($a_2$) a mixture of dihydroxy compounds essentially comprising
($a22$) from 15 to 99.8 mol% of a dihydroxy compound selected from the group consisting of $C_2$–$C_6$-alkanediols and $C_5$–$C_{10}$-cycloalkanediols,
($a_{22}$) from 85 to 0.2 mol% of a dihydroxy compound of the formula I

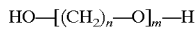

where n is 2, 3 or 4 and m is an integer from 2 to 250, or mixtures thereof,
where the molar ratio of ($a_1$) to ($a_2$) is from 0.4:1 to 1.5:1, and
($a_3$) from 0 to 5 mol%. based on ($a_1$), of a compound D having at least three groups capable of ester formation, ($c_2$) 0.01 to 50% by weight, based on ($c_1$), of a hydroxy carboxylic acid B1 of the formula IIa or IIb

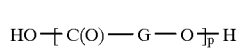

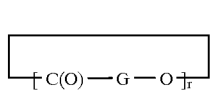

where p is an integer from 1 to 1500, r is an integer from 1 to 4, and G is a radical selected from the group consisting of phenylene, —$(CH_2)_k$—, where k is an integer from 1 to 5, —C(R)H— and —C(R)HCH—, where R is methyl or ethyl, and ($c_3$) 0 to 5 mol%, based on component ($a_1$), employed in the preparation of P1, of compound D,
and in a second step reacting Q1 with
($e_1$) from 0.1 to 5% by weight, based on the polyether ester Q1, of a bisoxazoline C1, and
($e_2$) from 0 to 5 mol%, based on component ($a_1$) employed in the preparation of the polyether ester Q1, of compound D.

19. A process for preparing a biodegradable polymer T3 having
a molecular weight ($M_n$) of from 10,000 to 100,000 g/mol,
a viscosity number of from 30 to 450 g/ml (measured in o-dichlorobenzene/phenol (50/50 ratio by weight) at a concentration of 0.5% by weight of polymer T3 at 25° C.), and
a melting point of from 50 to 235° C.,
which comprises in a first step preparing
($g1$) a polyether ester P2 which has
a molecular weight ($M_n$) of from 5000 to 80,000 g/mol,
a viscosity number of from 30 to 450 g/ml (measured in o-dichlorobenzene/phenol (50/50 ratio by weight) at a concentration of 0.5% by weight of polyether ester P2 at 25° C.), and
a melting point of from 50 to 235° C.,
and which has both hydroxyl and carboxyl end groups, where the molar ratio of carboxyl end groups to hydroxyl end groups is greater than one, and where P2 is obtained by reacting a mixture essentially comprising ($b1$) a mixture essentially comprising
20 to 95 mol% of adipic acid or ester-forming derivatives thereof or mixtures thereof,
5 to 80 mol% of terephthalic acid or ester forming derivatives thereof or mixtures thereof, and
0 to 5 mol% of a compound containing sulfonate groups, where the total of the individual mole percentages is 100 mol%, ($b_2$) a mixture of dihydroxy compounds essentially comprising
($a_2$1) from 15 to 99.8 mol% of a dihydroxy compound selected from the group consisting of $C_2$–$C_6$-alkanediols and $C_5$–$C_{10}$-cycloalkanediols, and
($a22$) from 85 to 0.2 mol% of a dihydroxy compound containing ether functionalities of the formula I

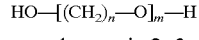

where n is 2, 3 or 4 and m is an integer from 2 to 250, or mixtures thereof,
where the molar ratio of ($b_1$) to ($b_2$) is of from 0.4:1 to 1.25:1,
($b_3$) from 0.01 to 100% by weight, based on component ($b_1$), of a hydroxy carboxylic acid B1 of the formula IIa or IIb

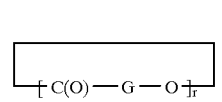

where p is an integer from 1 to 1500, r is an integer from 1 to 4, and G is a radical selected from the group consisting of phenylene, —$(CH_2)_k$—, where k is an integer from 1 to 5, —C(R)H— and —C(R)HCH$_2$—, where R is methyl or ethyl, and
($b_4$) from 0 to 5 mol%, based on component ($b_1$), of a compound D having at least, three groups capable of ester formation, or ($g_2$) a mixture essentially comprising the polyether ester P1 which has
a molecular weight ($M_n$) of from 5000 to 80,000 g/mol,
a viscosity number of from 30 to 450 g/ml (measured in o-dichlorobenzene/phenol (50/50 ratio by weight) at a concentration of 0.5% by weight of polyether ester P1 at 25° C.), and a melting point of from 50 to 200° C., and which has both hydroxyl and carboxyl end groups, where the molar ratio of carboxyl end groups to hydroxyl end groups is greater than one, and where P1 is obtained by reacting a mixture essentially comprising (a11) a mixture essentially comprising 20–95 mol% of adipic acid or ester-forming derivatives thereof or mixtures thereof, 5–80 mol% of terephthalic acid or ester-forming derivatives thereof or mixtures thereof, and 0–5 mol% of a compound containing sulfonate groups, where the total of the individual mole percentages is 100 mol%, and ($a_2$) a mixture of dihydroxy compounds essentially comprising ($a_{21}$) from 15 to 99.8 mol% of a dihydroxy compound selected from the group consisting of $C_2$–$C_6$-alkanediols and $C_5$–$C_{10}$-cycloalkanediols, and ($a_{22}$) from 85 to 0.2 mol% of a dihydroxy compound containing ether functionalities of the formula I, where the molar ratio of ($a_1$) to ($a_2$) is from 0.4:1 to 1.5:1, and ($a_3$) from 0 to 5 mol%, based on component ($a_1$), of a compound D having at least three groups capable of ester formation, and from 0.01 to 50% by weight, based on polyether ester P1, of the hydroxy carboxylic acid B1, or ($g_3$) a mixture essentially comprising polyether esters P1 which differ from one another in composition, and in a second step reacting ($g_1$) or ($g_2$) or ($g_3$) with 0.1 to 5% by weight, based on the polyether ester ($g_1$), ($g_2$) or ($g_3$), of a bisoxazoline C1, and 0 to 5 mol%, based on ($a_1$) or ($b_1$) employed in the preparation of the polyether ester ($g_1$), ($g_2$) or ($g_3$), of compound D.

* * * * *